(12) United States Patent
Au et al.

(10) Patent No.: US 8,369,417 B2
(45) Date of Patent: Feb. 5, 2013

(54) OPTIMAL DENOISING FOR VIDEO CODING

(75) Inventors: Oscar Chi Lim Au, Hong Kong (CN);
Liwei Guo, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 1663 days.

(21) Appl. No.: 11/750,498

(22) Filed: May 18, 2007

(65) Prior Publication Data

US 2007/0291842 A1    Dec. 20, 2007

Related U.S. Application Data (60) Provisional application No. 60/801,375, filed on May 19, 2006.

(51) Int. Cl.
*H03C 1/52* (2006.01)
*H04N 11/04* (2006.01)

(52) U.S. Cl. ........... 375/240.27; 375/240.2; 375/240.16; 375/240.21; 375/240.22; 375/240.24; 375/240.29; 380/200

(58) Field of Classification Search ............. 375/240.27, 375/240, 240.12, 240.16, 240.24, 240.22
See application file for complete search history.

(56) References Cited

U.S. PATENT DOCUMENTS

| | | | |
|---|---|---|---|
| 4,903,128 A | 2/1990 | Thoreau | |
| 5,497,777 A | 3/1996 | Abdel-Malek et al. | |
| 5,781,144 A | 7/1998 | Hwa | |
| 5,819,035 A | 10/1998 | Devaney et al. | |
| 5,831,677 A | 11/1998 | Streater | |
| 5,889,562 A | 3/1999 | Pau | |
| 5,982,432 A | 11/1999 | Uenoyama et al. | |
| 6,023,295 A | 2/2000 | Pau | |
| 6,090,051 A | 7/2000 | Marshall | |
| 6,094,453 A | 7/2000 | Gosselin et al. | |
| 6,101,289 A | 8/2000 | Kellner | |
| 6,182,018 B1 | 1/2001 | Tran et al. | |
| 6,211,515 B1 | 4/2001 | Chen et al. | |
| 6,249,749 B1 | 6/2001 | Tran et al. | |
| 6,285,710 B1 * | 9/2001 | Hurst et al. | ............. 375/240.12 |
| 6,343,097 B2 | 1/2002 | Kobayashi et al. | |
| 6,346,124 B1 | 2/2002 | Geiser et al. | |
| 6,424,960 B1 | 7/2002 | Lee et al. | |
| 6,442,201 B2 | 8/2002 | Choi | |
| 6,443,895 B1 | 9/2002 | Adam et al. | |
| 6,470,097 B1 | 10/2002 | Lai et al. | |
| 6,499,045 B1 | 12/2002 | Turney et al. | |
| 6,557,103 B1 | 4/2003 | Boncelete, Jr. et al. | |
| 6,594,391 B1 | 7/2003 | Quadranti et al. | |

(Continued)

FOREIGN PATENT DOCUMENTS

| | | |
|---|---|---|
| EP | 0270405 | 6/1988 |
| EP | 0797353 | 9/1997 |

(Continued)

OTHER PUBLICATIONS

Song et al, Motion-Compensated Temporal Filtering for Denoising in Video Encodeer, Jun. 24, 2004, vol. 40, No. 13, pp. 1-2.*

(Continued)

*Primary Examiner* — Edan Orgad
*Assistant Examiner* — Jenise Jackson
(74) *Attorney, Agent, or Firm* — Turocy & Watson, LLP (57) ABSTRACT

An optimal denoising method for video coding. This method makes use of very few pixels and linear operations, and can be embedded into the motion compensation process of video encoders. This method is simple and flexible, yet offers high performance and produces appealing pictures.

19 Claims, 6 Drawing Sheets

U.S. PATENT DOCUMENTS

| | | | |
|---|---|---|---|
| 6,633,683 | B1 | 10/2003 | Dinh et al. |
| 6,650,779 | B2 | 11/2003 | Dorrity et al. |
| 6,684,235 | B1 | 1/2004 | Turney et al. |
| 6,700,933 | B1 | 3/2004 | Wu et al. |
| 6,716,175 | B2 | 4/2004 | Geiser et al. |
| 6,771,690 | B2 | 8/2004 | Heikkila |
| 6,792,044 | B2* | 9/2004 | Peng et al. ............... 375/240.03 |
| 6,799,141 | B1 | 9/2004 | Stoustrup et al. |
| 6,799,170 | B2 | 9/2004 | Lee et al. |
| 6,801,672 | B1 | 10/2004 | Thomas |
| 6,827,695 | B2 | 12/2004 | Palazzolo et al. |
| 6,836,569 | B2 | 12/2004 | Le Pennec et al. |
| 6,840,107 | B2 | 1/2005 | Gan |
| 6,873,368 | B1 | 3/2005 | Yu et al. |
| 6,876,771 | B2 | 4/2005 | Prakash et al. |
| 6,904,096 | B2 | 6/2005 | Kobayashi et al. |
| 6,904,169 | B2 | 6/2005 | Kalevo et al. |
| 6,937,765 | B2 | 8/2005 | Skourikhine et al. |
| 6,944,590 | B2 | 9/2005 | Deng et al. |
| 6,950,042 | B2 | 9/2005 | Nakagawa et al. |
| 6,950,473 | B2 | 9/2005 | Kim et al. |
| RE39,039 | E | 3/2006 | Ro et al. |
| 7,034,892 | B2 | 4/2006 | Ojo et al. |
| 7,110,455 | B2 | 9/2006 | Wu et al. |
| 7,167,884 | B2* | 1/2007 | Picciolo et al. ............... 708/322 |
| 7,197,074 | B2* | 3/2007 | Biswas et al. ............. 375/240.16 |
| 7,363,221 | B2 | 4/2008 | Droppo et al. |
| 7,369,181 | B2 | 5/2008 | Kang et al. |
| 7,869,500 | B2 | 1/2011 | Yankilevich |
| 7,911,538 | B2* | 3/2011 | Ha et al. ........................ 348/607 |
| 2002/0024999 | A1* | 2/2002 | Yamaguchi et al. ..... 375/240.03 |
| 2005/0025244 | A1* | 2/2005 | Lee et al. ................. 375/240.16 |
| 2005/0135698 | A1* | 6/2005 | Yatsenko et al. .............. 382/260 |
| 2005/0280739 | A1* | 12/2005 | Lin et al. ....................... 348/607 |
| 2006/0228027 | A1* | 10/2006 | Matsugu et al. .............. 382/181 |
| 2006/0262860 | A1* | 11/2006 | Chou et al. ............... 375/240.24 |
| 2006/0290821 | A1* | 12/2006 | Soupliotis et al. ............ 348/701 |
| 2007/0053441 | A1* | 3/2007 | Wang et al. .............. 375/240.24 |
| 2007/0110159 | A1* | 5/2007 | Wang et al. .............. 375/240.16 |
| 2007/0126611 | A1* | 6/2007 | Streater ............................ 341/67 |
| 2007/0140587 | A1* | 6/2007 | Wong et al. ................... 382/275 |
| 2007/0171974 | A1* | 7/2007 | Baik ........................ 375/240.12 |
| 2007/0177817 | A1* | 8/2007 | Szeliski et al. ................ 382/275 |
| 2007/0195199 | A1* | 8/2007 | Chen et al. ..................... 348/607 |
| 2007/0257988 | A1* | 11/2007 | Ong et al. ...................... 348/182 |
| 2008/0151101 | A1* | 6/2008 | Tian et al. ...................... 348/448 |
| 2008/0292005 | A1* | 11/2008 | Xu et al. .................. 375/240.28 |
| 2010/0014591 | A1* | 1/2010 | Suzuki ...................... 375/240.24 |
| 2010/0220939 | A1* | 9/2010 | Tourapis et al. .............. 382/261 |
| 2011/0149122 | A1* | 6/2011 | Subbotin ....................... 348/242 |

FOREIGN PATENT DOCUMENTS

| | | |
|---|---|---|
| EP | 1040666 | 10/2000 |
| EP | 1239679 | 9/2002 |
| EP | 1711019 | 10/2006 |

OTHER PUBLICATIONS

Cheong et al, Adaptive Spatio-Temporal Filtering for Video De-Noising, 2004, IEEE, pp. 965-968.*

Kwon et al, A Motion-Adaptive De-Interlacing Method, Jun. 5, 1992, IEE, pp. 145-150.*

Girod, Why B-Pictures Work, 1998, IEE, pp. 213-217.*

Braspenning et al, 1997, True-Motion Estimation using Feature Correspondences, Philips Research Laboratories.*

L.W.Guo,O.C. Au, M.Y.Ma and Z.Q.Liang A multihypothesis motion-compensated temporal filter for video denoising,Proc.ICIP, 2006.

M.Lindenbaum, M.Fischer, and A.Bruckstein. "On gabpr contribution to image enhancement." Pattern Recognition, , 1994.

T.W.Chan, O.C.Au, T.K.Chong; W.S.Chau "A novel content-adaptive video denosing filter", Proc.ICASSP 2005.

R.Dugad and N.Ahuja, "Video denoising by combining kalman and wiener estimates," in Proc.ICIP, 1999.

Songs, B.C., and Chun, K.W.; "Motion compensated temporal filtering denoising in video encoder" Electronics Letters vol. 40, Issue 13, Jun. 24, 2004.

OA dated Mar. 1, 2012 for U.S. Appl. No. 12/122,163, 25 pages.

* cited by examiner

OPTIMAL DENOISING FOR VIDEO CODING

CROSS-REFERENCE TO OTHER APPLICATION

The present application claims priority from U.S. provisional application No. 60/801,375 filed May 19, 2006, which is hereby incorporated by reference.

BACKGROUND AND SUMMARY OF THE INVENTIONS

The present application relates generally to digital signal processing, and more particularly to a video compression, coding, filtering and representation system utilizing temporal redundancy and having both device and method aspects. It further relates to a computer program product, such as a recording medium, carrying program instructions readable by a computing device to cause the computing device to carry out methods according to the inventions.

BACKGROUND

Noising in Video Coding

The importance of video technology is constantly growing with the ever increasing use of television and video systems in consumer, commercial, medical and scientific applications.

Due to the huge size of the raw digital video data (or image sequences), compression must be applied to such data so that they may be transmitted and stored. Hybrid video coding scheme is the most common video coding scheme. It utilizes motion estimation (ME), discrete cosine transform (DCT)-based transform and entropy coding to exploit temporal, spatial and data redundancy, respectively. Most of the existing video coding standards conform to this hybrid scheme, such as the ISO/IEC MPEG-1, MPEG-2, MPEG-4 standards, the ITU-T H.261, H.263, H.264 standards and AVS or related video coding.

Video coding performance is typically evaluated in terms of two measures: coding distortion and compression capability. Due to internal quantization step, the hybrid coding scheme is a lossy coding process, which means that some information is lost in the coding process. Therefore, the decoded (reconstructed) video has some distortion compared to the original (uncoded) video. The best measure of coding distortion is subjective visual quality of the reconstructed video. But subjective quality evaluation is time consuming and requires many observers (both trained and untrained). An alternative is to use objective visual quality measure. A common objective visual quality measure is the peak signal-to-noise ratio (PSNR), defined as:

$$PSNR = 20\log \frac{255}{\left[\frac{1}{MNT}\sum_{t=1}^{T}\sum_{i=1}^{M}\sum_{j=1}^{N}[f(i,j,t)-\hat{f}(i,j,t)]^2\right]^{\frac{1}{2}}}$$

Where f (i, j, t) is the pixel at location (i,j) in frame t of the original video sequence, f̂(i, j, t) is the co-located pixel in the decoded video sequence (at location (i,j) in frame t). M and N are frame width and height (in pixels), respectively. T is the total number of frames in the video sequence. Typically, the higher the PSNR is, the higher subjective visual quality is.

Compression capability is usually measured in terms of bit rate, which is the number of bits used to encode video bit stream per second.

Unfortunately, digital video sequences are almost always corrupted by noise due to video acquisition, recording, processing and transmission. A main source of the noise is the noise introduced by capture device (e.g. CCD or CMOS sensor), especially when the scene is dark leading to low signal-to-noise ratio. Such noise introduced in video sequence is undesirable. It degrades the subjective quality of the video. It also affects the accuracy of motion estimation. In video coding systems such as MPEG-1/2/4 and H.261/3/4, temporal redundancy is exploited by motion estimation (ME) and motion compensation (MC) to achieve high coding efficiency. However, the noise is inherently independent among frames. Thus the presence of noise reduces temporal redundancy among consecutive frames and this can decrease the accuracy of the motion vectors obtained in motion estimation. Moreover, even if the motion vectors are accurate, the noise will make the residue frame noisy. As the noise typically exhibits little spatial redundancy, the energy of the noisy residue frame cannot be compacted by DCT. The noisy DCT coefficients would require significantly more bits to compress. As a result coding performance could drop very significantly due to the presence of noise, with a large part of the bandwidth or bit rate wasted to represent the undesirable noise. It is thus highly desirable to remove the noise before (purely pre-processing) or during (encoder-embedded denoising) the video encoding while preserving the original video contents.

Many denoising methods have been previously proposed, such as 2-D Kalman filter, Spatial Varying Filter (SVF), Spatial Temporal Varying Filter (STVF), Wavelet Shrinkage, neural network, adaptive wavelet filter, and motion-compensated Kalman filter. These filters are designed as purely pre-processing schemes independent of the video coding process and are to be cascaded with the encoders. Therefore, they require extra computation on top of the video encoder.

Optimal Denoising for Video Coding

The present application proposes a new purely pre-processing denoising method named Multi-Hypothesis Motion Compensated Filter (MHMCF). This pre-processing denoising method is based on the temporal linear minimum mean square error (LMMSE) estimator and requires much fewer pixels (in our simulation 3 pixels are enough) as input than most existing denoising filters to achieve same or better performance. Based on the MHMCF, the application further proposes an improved denoising method named Embedded Optimal Denoising Filter (EODF). Unlike the purely pre-processing approach, this filter can be seamlessly embedded into the motion compensation process of video encoders with nearly no extra computation introduced.

The advantages of the proposed approach are highlighted as follows:

This approach is simple to implement because it requires much fewer pixels as input with some linear operations;

This approach achieves better performance because the filter coefficients are determined based on linear minimum mean squared error estimator;

This approach is flexible because there is no limitation on the number of references involved in the filtering, and the more the references are, the better the performance is. Further, it allows the use of both past frames and future frames, of both previously denoised frames and the undenoised frames;

This approach can be seamlessly embedded into the motion compensation process of video encoders. Therefore, unlike the standalone purely pre-processing approach, this approach introduces nearly no extra computation;

For P frames, video encoder with this approach embedded is compatible with MPEG-1, MPEG-2, MPEG-4, H.261, H.263, H.264 or AVS standards The standard can be modified easily to accommodate B frames; and The approach produces encoded frame more visually pleasing. That is because the traditional methods preserve large amplitude High Frequency (HF) coefficients caused by noise. After inverse quantization and inverse transform, these HF coefficients would cause "mosaic" phenomena, which are very visually annoying.

Note that many of these advantages are obtained by the cooperation among the various elements of the invention, which work synergistically with each other.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

The Multi-hypothesis Motion Compensated Filter (MH-MCF)

Figure 1:
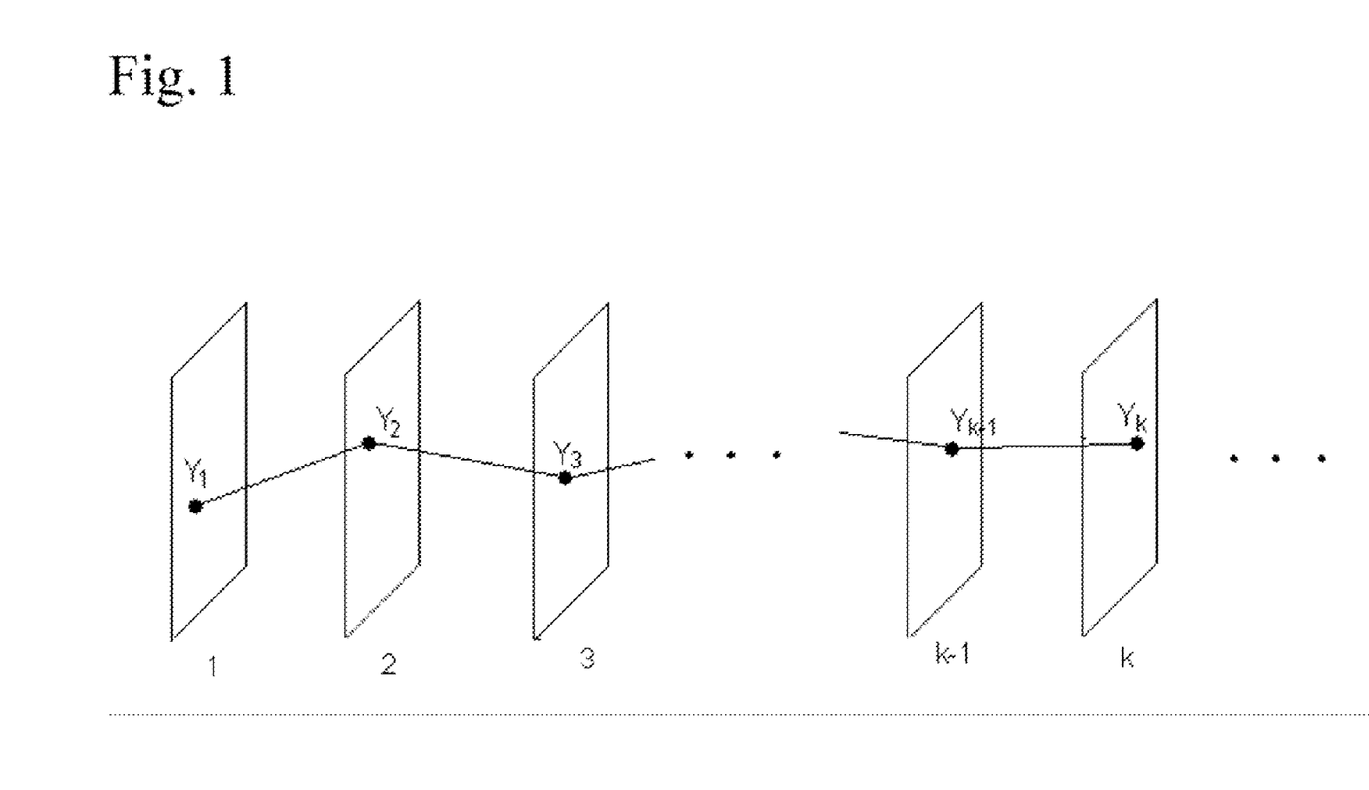
FIG. 1 shows a video sequence composed of consecutive frames.

As shown in FIG. 1, a video sequence is composed of many consecutive frames. In the video sequence, assume there is a point object which can be tracked in all the frames. Suppose the original intensity value of this point object in frame k is $X_k$, and the observed value is $$Y_k = X_k + N_k. \tag{1}$$

where $N_k$ is the undesirable noise. $N_k$ is assumed zero mean, with variance $\sigma_n^2$. It is also assumed that $N_k$ is independent over space and time and independent of $X_k$.

Ideally, $X_k$ should be the same for all k. However, due to many reasons including inaccurate motion estimation, changing light conditions, and deforming objects, $X_k$ changes from one frame to another. This can be described as $$X_k = X_i + Z_{i,k} \tag{2}$$

where $Z_{i,k}$ represents the innovation in $X_k$ compared to $X_i$. $Z_{i,k}$ is a random variable with mean $\overline{Z_{i,k}}$ and variance $\sigma_{z(i,k)}^2$. $Z_{i,k}$ is assumed to be independent of $N_k$ and $X_i$.

A preferred embodiment will use some or all of $\{Y_1, Y_2, \ldots\}$ to estimate $X_k$. Note that the pixels of those $\{Y_1, Y_2, \ldots\}$ are selected as the current pixel's temporal predictions. And these temporal predictions are defined as the hypotheses of the current pixel. How to select these temporal predictions is out of the scope of this application.

Suppose a class of preferred embodiments chooses $\{Y_{ref1}, Y_{ref2}, \ldots, Y_{refm}, Y_k\}$ to estimate $X_k$. The proposed non-homogenous linear estimator can be expressed as $$\overline{X}_k = \sum_{j=1}^{m} a_j Y_{refj} + a_c Y_k + c \tag{3}$$

Based on the LMMSE estimator, the coefficients are determined as follows:

$$a_i = \frac{\sigma_{z(refi,k)}^{-2}}{\sum_{j=1}^{m} \sigma_{z(refj,k)}^{-2} + \sigma_n^{-2}} \quad i = 1 \ldots m \tag{4}$$

$$a_c = \frac{\sigma_n^{-2}}{\sum_{j=1}^{m} \sigma_{z(refj,k)}^{-2} + \sigma_n^{-2}} \tag{5}$$

$$c = \sum_{j=1}^{m} a_j \overline{Z_{refj,k}} \tag{6}$$

and the estimation error variance is $$E\left[(\overline{X}_k - X_k)^2\right] = \frac{1}{\sum_{j=1}^{m} \sigma_{z(refj,k)}^{-2} + \sigma_n^{-2}} \tag{7}$$

Details of MHMCF

Suppose the current frame is $Y_k$. Let $ref_1, ref_2, \ldots ref_m$ be some previously denoised frames which are used as references (hypotheses of the current frame). And the undesirable noise variance in $Y_k$ is denoted as $\sigma_n^2$. Here details a preferred embodiment of applying MHMCF for $Y_k$:

1. Divide the current frame $Y_k$ into rectangle blocks.
2. The blocks are processed in raster-scan order. Steps 3-10 are the detailed steps for each block. Suppose the current block is B(i, j) and (i,j) is the coordinates of the pixel at the upper left corner. Initialize p=1 (index for ref1).
3. Set $ref_p$ as the reference frame and perform motion estimation (using some appropriate distortion measure and search strategy). Denote $R_p(i_p, j_p)$ as the chosen block by motion estimation with regards to $ref_p$.
4. Denote residue block of B(i, j) with respect to $ref_p$ as $Res_p(i, j)$, which is derived as follows: $Res_p(i, j) = B(i, j) - R_p(i_p, j_p)$
5. Calculate the mean and the variance of $Res_p(i, j)$. Denote $c_1$ as the mean and $\sigma_{p\_n}^2$ as the variance. Define $\sigma_{z(refp,k)}^2 = \max(0, \sigma_{p\_n}^2 - \sigma_n^2)$.
6. Change p to 2-m, and repeat step 3-5. After this step, $c_1 \ldots c_k, \sigma_{z(ref1,k)}^2 \ldots \sigma_{z(refm,k)}^2$ and $R_1(i_1, j_1) \ldots R_m(i_m, j_m)$ are supposed to be available.
7. Compute the filter coefficients $a_i$, $i=1 \ldots m$:

$$a_i = \frac{\sigma_{z(refi,k)}^{-2}}{\sum_{j=1}^{m} \sigma_{z(refj,k)}^{-2} + \sigma_n^{-2}}$$

8. Compute filter coefficient $a_c$:

$$a_c = \frac{\sigma_n^{-2}}{\sum_{j=1}^{m} \sigma_{z(refj,k)}^{-2} + \sigma_n^{-2}}$$

9. Compute mean compensation c as follows:

$$c = \sum_{j=1}^{m} a_j c_j$$

10. Denote the denoised output of current block B(i, j) as B' (i, j), which is calculated as follows:

$$B(i, j) = a_c B(i, j) + \sum_{j=1}^{m} a_j R_j(i_j, j_j) + c$$

11. If all the blocks in $Y_k$ have been denoised, go to step 12. Otherwise, go to step 3 to process the next block.
12. Add the current denoised frame into reference buffer to facilitate denoising for the next frame.

MHMCF Simulation Results

Experiments have been conducted to evaluate the performance of MHMCF. Four samples of test video sequences named "Akiyo", "Foreman", "Children" and "News" are in CIF format. Gaussian noise with variance 169 is added to the luminance components. In the tests both MHMCF with 1 reference (1HMCF) and MHMCF with 2 references (2HMCF) are based on our embodiments, and STVF is not. 1HMCF, 2HMCF and STVE are used to process the first 100 frames of each sequence.

The following Table I shows the denoising performance of different filters in terms of PSNR. It can be seen that both of our MHMCF, i.e. 1HMCF and 2HMCF, have better denoising performance than STVF and 2HMCF has the best performance (for sample "Akiyo", the PSNR gain can be 8.85 dB). This is consistent with equation (7), which indicates that the more the references (hypotheses) are used, the better denoising performance can be achieved. If 3 or more reference frames were to be used, it should have achieved better performance.

TABLE 1

Denoising performance

| Sample Name | PSNR(dB) | | | |
|---|---|---|---|---|
| | Unfiltered | STVF | 1HMCF | 2HMCF |
| Akiyo | 25.86 | 30.61 | 33.37 | 34.71 |
| Foreman | 25.89 | 30.12 | 31.24 | 32.01 |
| Children | 25.9 | 29.53 | 29.90 | 30.58 |
| News | 25.89 | 30.02 | 31.45 | 32.80 |
| Average Gain | 0 | 4.19 | 5.61 | 6.64 |

To evaluate the subjective quality of denoised video, some frames of sample "Akiyo" and sample "Foreman" processed by different denoising methods are shown in Appendix A. Test results show that MHMCF can dramatically increase the subjective quality. After filtering, most of the noise is removed, but fine details are still well preserved (e.g. hair of person in sample "Akiyo"). On the contrary, STVF cannot remove large amplitude noise and the picture is not visually pleasing.

To evaluate the improvement of coding efficiency, MHMCF filtered video sequences are coded using H.264 software, JM 8.3. The first frame is I frame and the rest are P frames. Only 16×16 block size and 1 reference frame are used in motion estimation. The coding performance of samples "Akiyo" and "Foreman" are given out in the following Table II and III respectively. Obviously, the coding efficiency is dramatically improved for those MHMCF filtered video sequences, especially when bit rate budget is adequate.

TABLE II

Sample "Akiyo" Test Results

| | Unfiltered | | 1HMCF | | 2HMCF | |
|---|---|---|---|---|---|---|
| QP | PSNR (dB) | Bitrate (kbps) | PSNR (dB) | Bitrate (kbps) | PSNR (dB) | Bitrate (kbps) |
| 19 | 26.54 | 12590 | 33.73 | 3471.86 | 34.80 | 1481.06 |
| 25 | 27.03 | 8631 | 34.3 | 883.78 | 34.49 | 431.65 |
| 31 | 27.66 | 4063 | 33.82 | 177.87 | 33.23 | 142.82 |
| 37 | 33.55 | 147 | 31.53 | 84.68 | 31.20 | 82.01 |

TABLE III

Sample "Foreman" Test Results

| | Unfiltered | | 1HMCF | | 2HMCF | |
|---|---|---|---|---|---|---|
| QP | PSNR (dB) | Bitrate (kbps) | PSNR (dB) | Bitrate (kbps) | PSNR (dB) | Bitrate (kbps) |
| 19 | 26.56 | 12426 | 31.45 | 5246.34 | 32.01 | 3219.29 |
| 25 | 27.02 | 8467 | 31.59 | 2061.73 | 31.72 | 1117.72 |
| 31 | 27.51 | 4175 | 31.36 | 503.58 | 30.76 | 371.76 |
| 37 | 30.95 | 293 | 29.55 | 173.27 | 29.06 | 160.19 |

Motion Compensation in Hybrid Video Coding Scheme

Motion compensation is a critical part of hybrid video coding scheme. The input of motion compensation is the residue and the reconstructed reference frames. These reference frames are combined by linear averaging to generate a predicted frame. Residue is the difference between the current frame and the predicted frame, and would be encoded and transmitted to the decoder for the reconstruction of the current frame. In motion compensation process, the current frame is reconstructed by adding the residue frame back to the predicted frame.

Taking bi-direction prediction into consideration, the motion compensation of hybrid coding scheme can be generalized as follows (the effect of quantization on residue is ignored):

$$Y_k(i,j) = b_1 Y_{ref1}(i,j) + b_2 Y_{ref2}(i,j) + res(i,j) \quad (8)$$

where $Y_k(i, j)$ is the pixel with coordinates (i, j) in the current frame which is to be reconstructed; $Y_{ref1}(i, j)$ and $Y_{ref2}(i, j)$ are the hypotheses (temporal predictions) of $Y_k(i, j)$ found by ME in two reference frames, respectively. Linear combination of these two hypotheses, i.e. $b_1 Y_{ref1}(i, j) + b_2 Y_{ref2}(i, j)$ is used as the prediction of the current video $Y_k(i, j)$. As stated before, residue res(i, j) is the difference between $Y_k(i, j)$ and its prediction $b_1 Y_{ref1}(i, j) + b_2 Y_{ref2}(i, j)$. res(i, j) can be expressed as follows:

$$res(i,j) = Y_k(i,j) - (b_1 Y_{ref1}(i,j) + b_2 Y_{ref2}(i,j)) \quad (9)$$

For P frame, only one reference frame, say, $Y_{ref\,1}$ is used, which indicates that $b_2=0$. For B frames, both $Y_{ref1}$ and $Y_{ref2}$ are utilized and $b_1+b_2=1$.

The Encoder-embedded Optimal Denoising Filter (EODF)

The proposed embodiment for an EODF is based on MHMCF. In the embodiment, a MHMCF filter with 2 references is expressed as follows:

$$X_k(i,j) = a_1 Y_{ref1}(i,j) + a_2 Y_{ref2}(i,j) + a_c Y_k(i,j) + c \quad (10)$$

$$\text{Let } b_1 = \frac{a_1}{(1-a_c)} = \frac{\sigma_{z(ref1,k)}^{-2}}{\sum_{j=1}^{2} \sigma_{z(refj,k)}^{-2}},$$

$$b_2 = \frac{a_2}{(1-a_c)} = \frac{\sigma_{z(ref2,k)}^{-2}}{\sum_{j=1}^{2} \sigma_{z(refj,k)}^{-2}}$$

As defined before, $$res(i,j) = Y_k(i,j) - (b_1 Y_{ref1}(i,j) + b_2 Y_{ref2}(i,j))$$

Combining equations (9) and (10), the following equation can be obtained:

$$\tilde{X}_k(i,j) = b_1 Y_{ref1}(i,j) + b_2 Y_{ref2}(i,j) + a_c res(i,j) + c \quad (11)$$

Comparing equation (11) with equation (8), one of ordinary skill in the art can see the only difference is that for the former, res (i, j) is scaled by $a_c$ and an extra constant c is added. Therefore, this filter can be seamlessly incorporated into bi-direction motion compensation in video encoder.

In the embodiment, for 1 reference case, the MHMCF has the following form:

$$\tilde{X}_k(i,j) = a_1 Y_{ref1}(i,j) + a_c Y_k(i,j) + c$$

It's easy to show that $a_1+a_c=1$ which indicates that $b_1=1$. The following equation can be obtained:

$$\tilde{X}_k(i,j) = Y_{ref1}(i,j) + a_c res(i,j) + c \quad (12)$$

Figure 2:
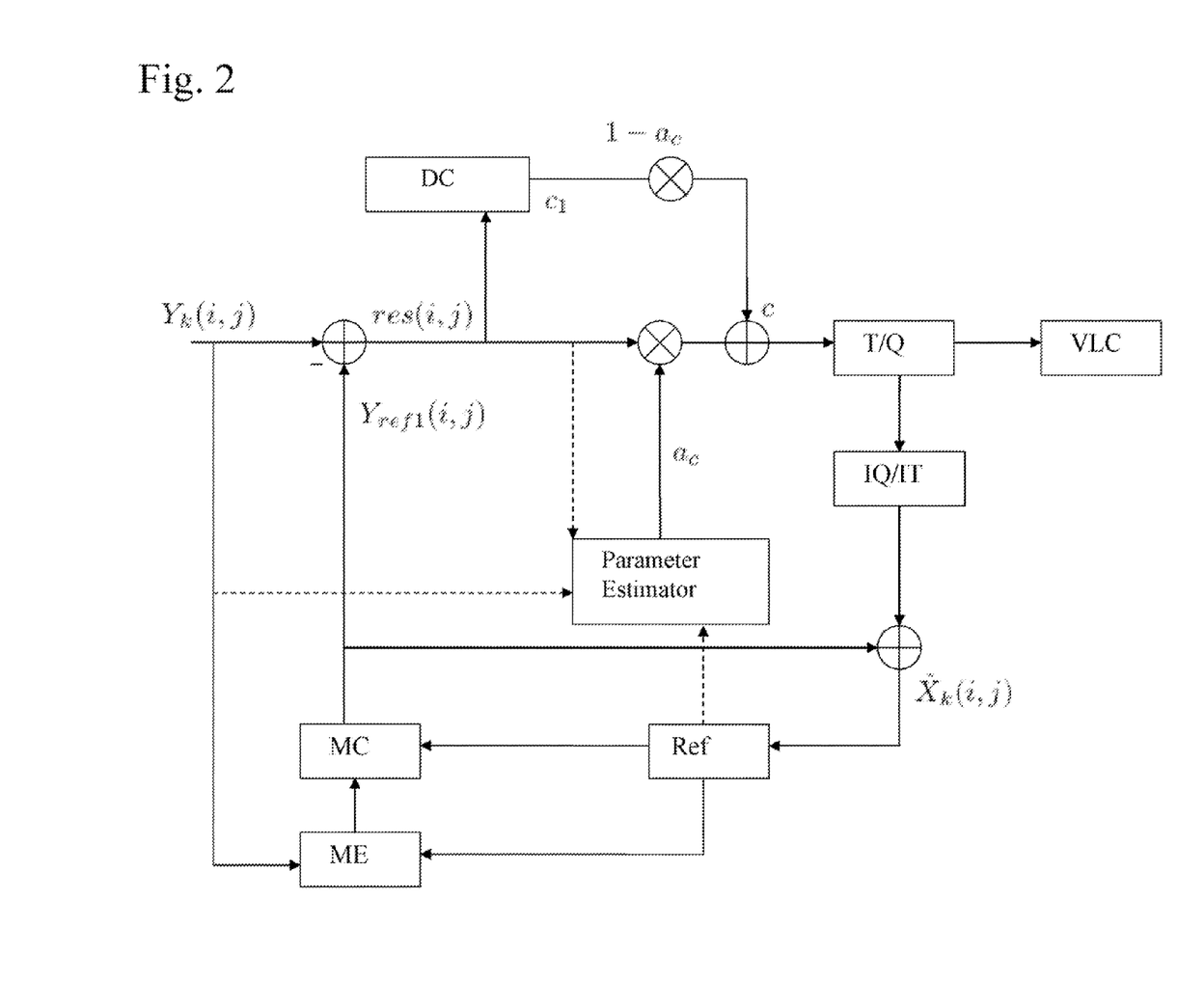
FIG. 2 illustrates a video encoder with EODF embedded (1 reference frame).

This filter only needs to scale down the residue and add an extra constant c, and can be easily incorporated into one-direction motion compensation process. Such a video encoder is illustrated in FIG. 2.

To summary, the preferred embodiment presents EODF for motion compensation with one and two reference frames in equation (11) and (12) respectively. At most two reference frames are used in current video coding standards. However, the proposed EODF can be easily extended to be embedded into motion estimation with more reference frames.

DCT Domain Implementation of Encoder-embedded Optimal Denoising Filter (EODF)

The previous section discussed an embodiment of EODF implementation on residue domain, operating on residue coefficients. Another embodiment of EODF can also be on Discrete Cosine Transform ("DCT") domain.

Let Res(i, j) be the residue block of size N×M (i=1, ..., N, j=1, ..., M). Define TRes(i, j) to be the DCT transform of residue block Res(i, j). Obviously, TRes(i, j) is also of size N×M.

DCT domain EODF modifies DCT coefficients as follows, $$TRes'(i,j) = TRes(i,j) \quad i=1 \text{ and } j=1$$

$$TRes'(i,j) = TRes(i,j) * a_c, \quad i \neq 1 \text{ or } j \neq 1$$

where TRes (i, j) is the modified DCT coefficient, $a_c$ is the scale factor defined in the previous section.

EODF Details

The preferred embodiment here only describes the detailed steps of EODF with 1 reference frame. The detailed steps of EODF with 2 reference frames are similar and should be obvious to one of ordinary skill in the art.

Let $Y_k$ be the current frame to be processed and $ref_1$ be the reference frame. Suppose the noise variance in the current frame is $\sigma_n^2$.

1. Denote the current residue block to be denoised as Res(i, j) step 2-6 are performed:
2. Calculate the mean and the variance of Res (i, j). Denote $c_1$ as the mean and $\sigma_{1\_n}^2$ as the variance. Define $\sigma_{z(ref1,k)}^2 = \max(0, \sigma_{1\_n}^2)$.
3. Compute scaling factor $a_c$:

$$a_c = \frac{\sigma_n^{-2}}{\sigma_{z(ref1,k)}^{-2} + \sigma_n^{-2}}$$

4. Compute mean compensation c:

$$c = (1-a_c)c_1$$

5. Compute the denoised residue block Res'(i, j) as follows:

$$Res'(i,j) = a_c * Res(i,j) + c$$

6. Apply transform and quantization to the denoised residue block Res'(i, j). Then write it into bit stream.
7. Use the denoised residue to reconstruct the denoised current block.
8. If all the residue blocks of the current frame are processed, go to step 9; otherwise, go to step 1 to process the next residue block.
9. Add the current denoised frame into reference buffer to facilitate the denoising of the next frame.

EODF Simulation Results

In the preferred embodiment the proposed EODF is embedded into H.264 reference software, JM 8.3 and simulated using various QP, bit rate and video sequences. Another encoder-embedded denoising filter—transform domain temporal filter (TDTF) is also implemented for comparison in the simulation. Three sample test sequences named "Akiyo", "Foreman" and "Stefan" are in CIF format. Gaussian noise with variance 169 is added to the luminance components of these test sequences. The first 100 frames are encoded by the original JM 8.3 (JMO), JM8.3 with TDTF (JMT) and JM8.3 with the proposed EODF (JMP). The first frame is I frame and the rest are P frames.

Tables IV-VI compare Rate-distortion (RD) performance with QP ranging from 19-37.

TABLE IV

Sample "Akiyo" Test Results

| | JMO | | JMT | | JMP | |
|---|---|---|---|---|---|---|
| QP | PSNR (dB) | Bitrate (kbps) | PSNR (dB) | Bitrate (kbps) | PSNR (dB) | Bitrate (kbps) |
| 19 | 26.54 | 12590 | 32.78 | 6409 | 35.91 | 1544 |
| 25 | 27.03 | 8631 | 33.65 | 1907 | 35.59 | 470 |
| 31 | 27.66 | 4063 | 33.2 | 213 | 33.22 | 218 |
| 37 | 33.55 | 147 | 30.72 | 101 | 31.29 | 103 |

TABLE V

Sample "Foreman" Test Results

| | JMO | | JMT | | JMP | |
|---|---|---|---|---|---|---|
| QP | PSNR (dB) | Bitrate (kbps) | PSNR (dB) | Bitrate (kbps) | PSNR (dB) | Bitrate (kbps) |
| 19 | 26.56 | 12426 | 31.52 | 6910 | 32.77 | 3074 |
| 25 | 27.02 | 8467 | 31.46 | 2500 | 32.33 | 1038 |
| 31 | 27.51 | 4175 | 30.68 | 337 | 31.1 | 356 |
| 37 | 30.95 | 293 | 28.1 | 150 | 29.16 | 166 |

TABLE VI

Sample "Stefan" Test Results

| | JMO | | JMT | | JMP | |
|---|---|---|---|---|---|---|
| QP | PSNR (dB) | Bitrate (kbps) | PSNR (dB) | Bitrate (kbps) | PSNR (dB) | Bitrate (kbps) |
| 19 | 26.54 | 13172 | 29.7 | 7875 | 31.23 | 4986 |
| 25 | 26.97 | 8892 | 29.41 | 3196 | 30.5 | 2234 |
| 31 | 27.28 | 4499 | 27.64 | 656 | 28.73 | 832 |
| 37 | 28.37 | 601 | 23.74 | 261 | 26.05 | 327 |

Figure 3:
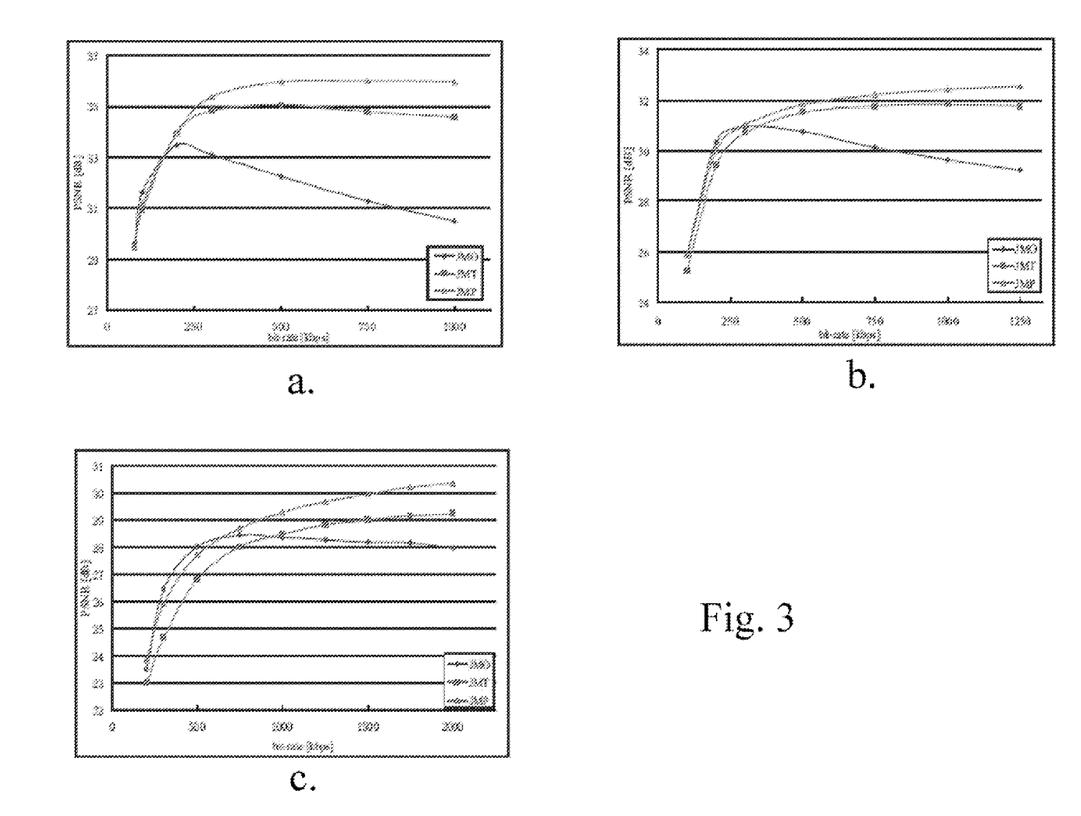
FIG. 3 illustrates Rate Distortion performance of the video encoded by JM with EODF embedded.
Figure 3A:
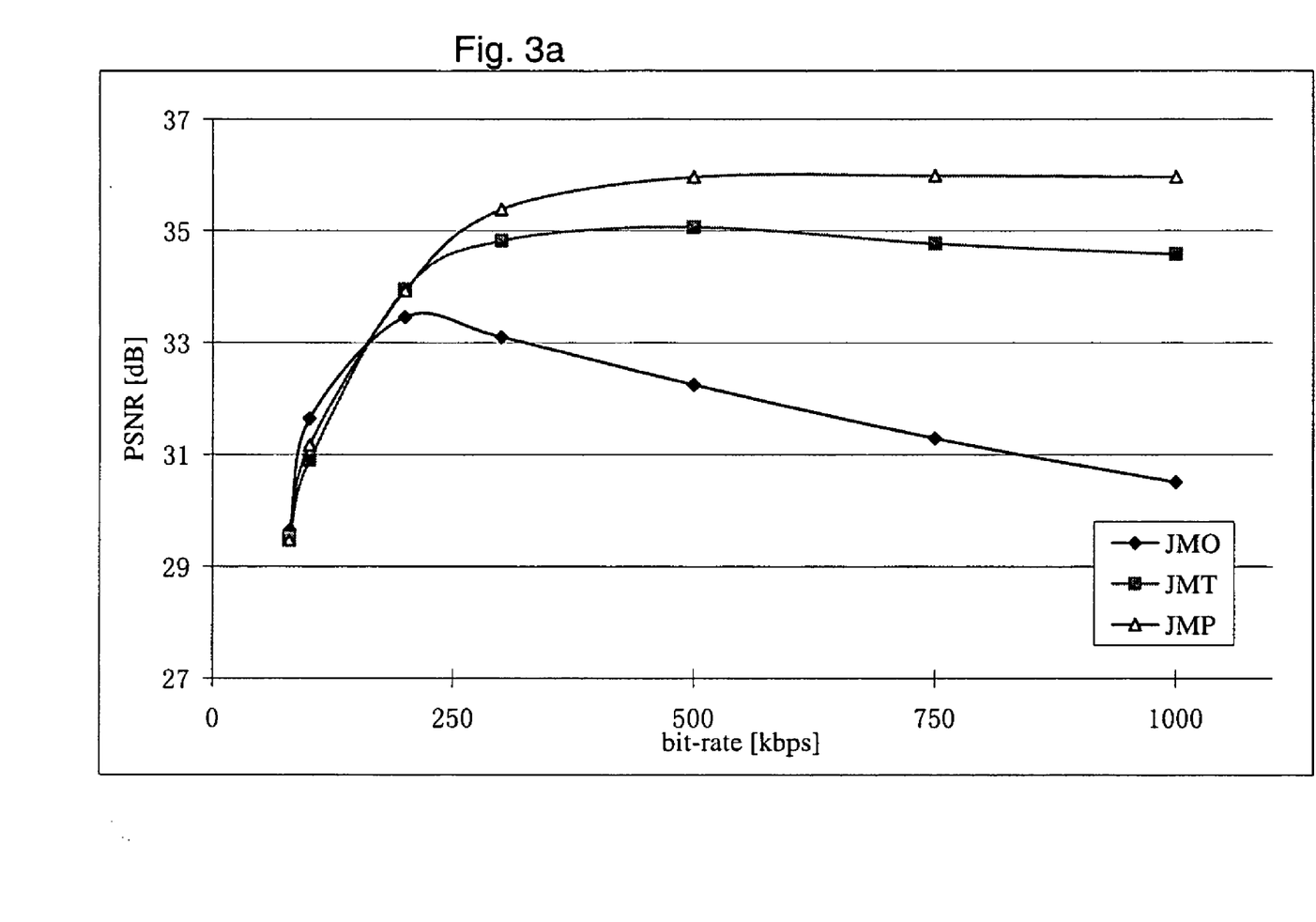
FIG. 3(a) is RD Curve for sample one "Akiyo" frame.
Figure 3B:
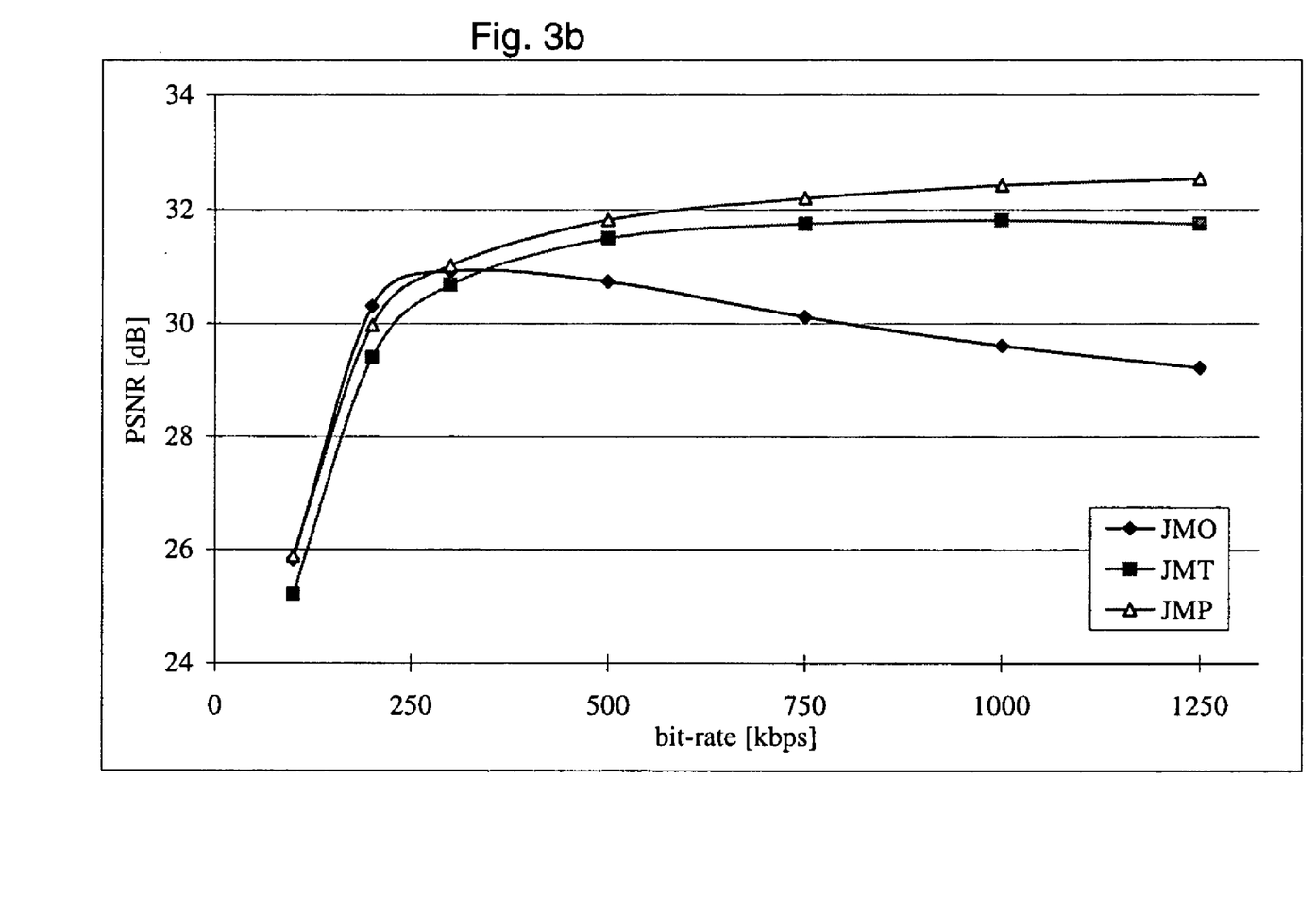
FIG. 3(b) is RD Curve for sample two "Foreman" frame.
Figure 3C:
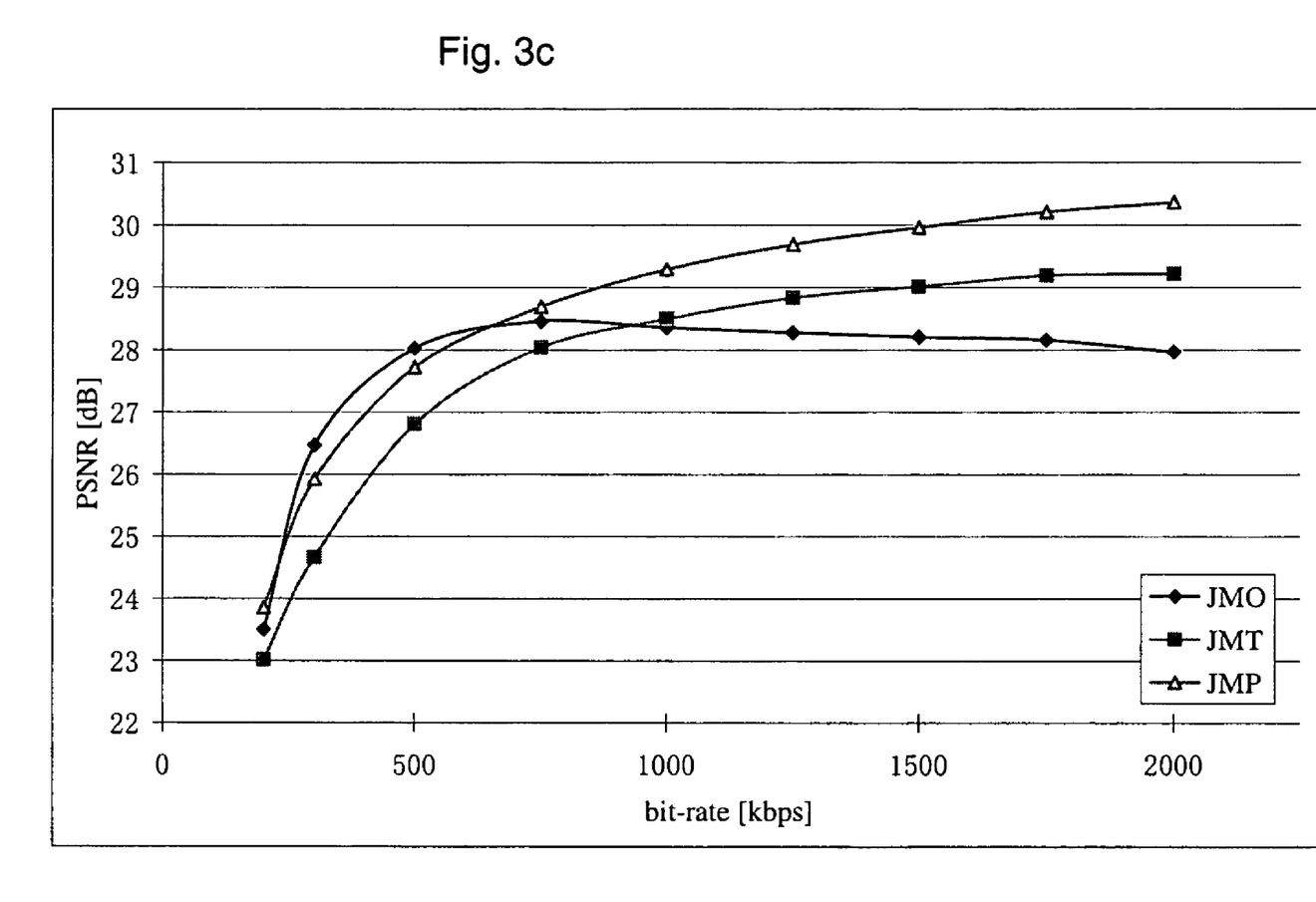
FIG. 3(c) is RD Curve for sample three "Stephen" frame.

FIG. 3 shows the comparison of RD performance with fixed bit rate. It can be seen JMP (EODF) has much better noise suppress performance compared to JMT and JMO. It can dramatically increase PSNR and reduce bit rate for noisy video coding, especially for low QP (high bit rate). Some reconstructed frames are shown in Appendix B to evaluate the subjective quality. The test results show that the frame encoded by JMP is obviously less noisy and more visually pleasing.

When QP is large (bit rate is low), the gaps between these three curves become smaller. This is because some small amplitude high frequency (HF) coefficients caused by noise will be quantized to 0 when QP is large. In some extreme cases, the performance of JMO is even better than JMP in terms of PSNR. However, with JMP, the encoded frame is more visually pleasing. The reason is that, for JMO, although HF coefficients with small amplitude are removed, those with large amplitude can survive quantization. After inverse quantization and inverse transform, these HF coefficients will cause "mosaic" phenomena which are very visually annoying. Tests are also performed on a frame encoded at low bit rate by JMO and JMP, respectively. Appendix C shows the test results. Although PSNR is 0.47 dB lower, the frame encoded by JMP looks better.

Modifications and Variations

As will be recognized by those of ordinary skill in the art, the innovative concepts described in the present application can be modified and varied over a tremendous range of applications, and accordingly the scope of patented subject matter is not limited by any of the specific exemplary teachings given.

MHMCF Modifications and Variations

For example, in the above embodiment, step 7 uses m previously denoised frames as the reference (hypothesis). However, the reference frames are not necessarily limited to denoised ones. Another class of embodiments can use all frames, denoised or not, in this sequence. In another class of embodiments, the number of references, m, can be any natural number. Moreover, m can be different for different k.

For another example, note that in step 1 of the current embodiment, different blocks can have same or different sizes. In different class of embodiments, the blocks may be different, non-rectangle (e.g. triangular, hexagonal, irregular, etc) shapes. Further, the blocks can be disjoint or overlapped. And in extreme cases, the block can contain only 1 pixel.

Yet, for another example, there are various ways to implement the motion estimation in step 3. For instance, it can be block-based motion estimation such as full search, 3-step search, or other search. Further, such block-based motion estimation may use pixels in the block and outside the block. For color video, the motion estimation may be based on only one color component, but can use more than one component also. Apart from block-based motion estimation, in other class of embodiments the motion can also be obtained using other methods such as optical flow, or even manually input.

Note that in step 2, the blocks are processed in raster scan order in current embodiment. Yet in other embodiments, the blocks can be processed in other order.

Note that in step 5, $\sigma_{z(refi,k)}^2$ is defined as $\sigma_{z(refi,k)}^2 = max(0, \sigma_{i\_n}^2 - \sigma_n^2)$. This can be generalized as a $\sigma_{z(refi,k)}^2 = d*max(0, \sigma_{i\_n}^2 - \sigma_n^2)$ to achieve more accurate parameter estimation in other class of embodiments.

In video sequences with scene changes, yet another class of embodiments might suggest that frames in different scenes should not be used to denoise each other even if some frames happen to be similar.

Finally, MHMCF can be implemented using recursive or non-recursive means.

EODF Modifications and Variations

In the preferred embodiment, EODF is embedded into video encoder with one or two reference frames. However, other embodiments can also embed EODF into video encoder with more than 2 reference frames.

There are other classes of EODF embodiments. For example, in step 1, the residue block to be denoised can be of any size and any shape.

For another example, in step 2, $\sigma_{z(ref1,k)}^2$ is calculated as $\sigma_{z(ref1,k)}^2 = max(0, \sigma_{1\_n}^2 - \sigma_n^2)$. Again, this can be generalized in other class of embodiments as $\sigma_{z(ref1,k)}^2 = d*max(0, \sigma_{1\_n}^2 - \sigma_n^2)$ to achieve more accurate parameter estimation in practice.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method implemented by a video encoder of denoising in video coding, comprising:
   dividing a current frame into blocks;
   selecting at least one other video frame;
   selecting a current block from said current frame and a reference block corresponding to the current block from said at least one other video frame;
   generating a residue block as a function of a difference between said current block and said reference block; and
   performing a linear combination based at least in part on a mean compensation, wherein a weight of the mean compensation is determined adaptively and at least partially dependent on a variance and a mean of the residue block, and the linear combination is performed on pixels contained in said current block and corresponding pixels contained in said reference block to output denoised values.

2. The method of claim 1, wherein said pixels are sets of sub-pixels at sub-pixel locations.

3. The method of claim 1, wherein said at least one other video frame is not sequentially adjacent to said current frame.

4. The method of claim 1, further comprising:
obtaining said reference block including performing a search within a predefined search area related to said current block as a function of a difference between said current block and said reference block.

5. The method of claim 4, wherein said performing said search includes implementing a full search algorithm.

6. The method of claim 1, wherein said blocks are each a 3×3 square used to perform motion estimation and obtain the reference block.

7. The method of claim 1, wherein said blocks are rectangular.

8. The method of claim 1, wherein said blocks are each a hexagon.

9. The method of claim 1, wherein said blocks each contain one pixel.

10. The method of claim 1, wherein the mean compensation is constructed as a function of said variance and said mean of said residue block.

11. The method of claim 1, wherein said video frames are denoised frames and non-denoised frames.

12. The method of claim 1, wherein said video frames are past frames and future frames.

13. The method of claim 1, wherein said video frames are never-encoded frames and previously-encoded frames.

14. A method implemented by a video encoder of denoising in video coding, comprising:
selecting a current frame and at least one other reference frame;
obtaining a predicted frame by performing motion estimation on said at least one other reference frame;
dividing said current frame and said predicted frame into current blocks in said current frame and co-located blocks in said predicted frame;
performing motion compensation to obtain a residue frame comprising residue blocks constructed as a function of a difference between said current blocks and said co-located blocks;
generating denoised values by performing linear combination, with weight determined adaptively and at least partially dependent on a variance and a mean of said residue blocks, in dependence of said predicted frame and said residue frame.

15. The method of claim 14, wherein said performing said motion estimation is adaptive to estimated noise variance of said co-located blocks.

16. The method of claim 15, wherein said performing said motion estimation includes a linear combination of said co-located blocks with the weight determined adaptively in dependence of the estimated noise variance of said co-located blocks.

17. The method of claim 14, wherein said generating said denoised values by performing said linear combination is integrated with said performing said motion compensation.

18. A video coding system, comprising:
a filter; and
a video coding unit;
wherein said filter operates in conjunction with said video coding unit to perform:
selection of a current frame and at least one other reference frame;
construction of a predicted frame by performance of motion estimation on said at least one other reference frame;
determination of current blocks and co-located blocks by division of said current frame and said at least one other reference frame;
construction of a residue frame containing residue blocks obtained by performance of motion compensation as a function of a difference between said current blocks and said co-located blocks; and
determination of new values by performance of a linear combination on said predicted frame and said residue frame with weights determined adaptively and at least partially dependent on a variance and a mean of said residue blocks; and
wherein said video coding unit operates on said new values to generate a denoised frame.

19. The system of claim 18, wherein said filter operates in conjunction with said video coding unit to integrate said determination of said new values with said determination of said residue frame.

* * * * *